Patented Dec. 19, 1922.

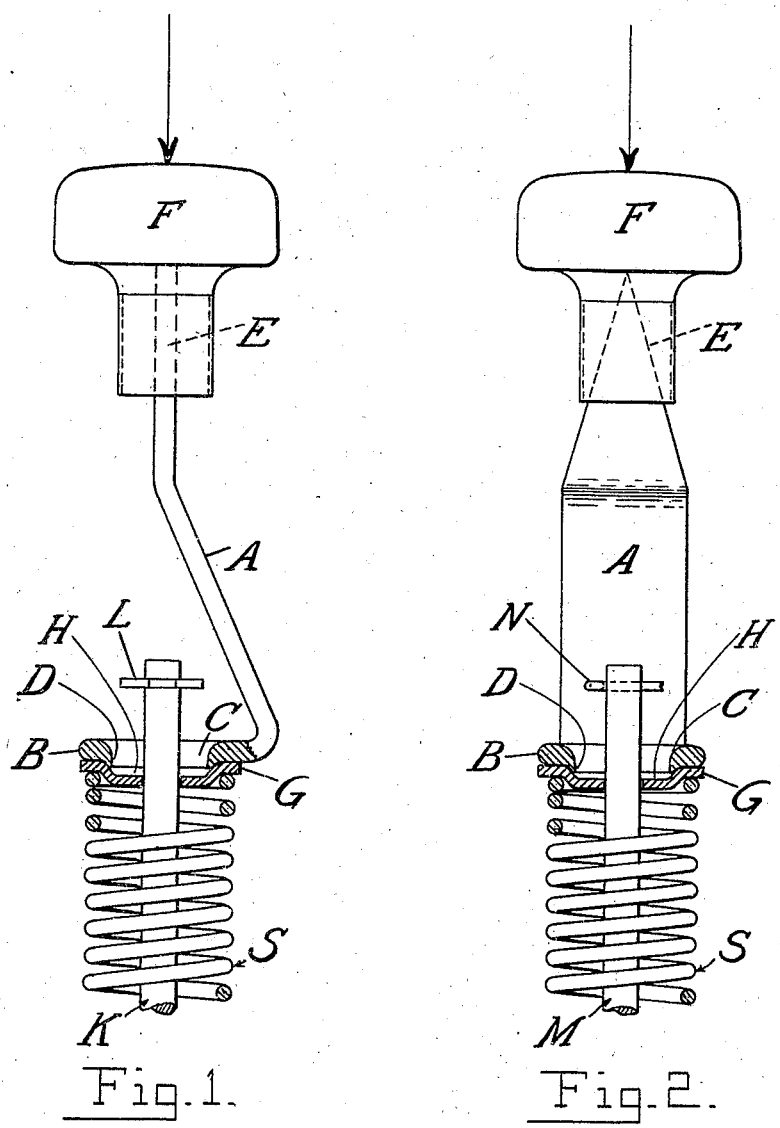

1,439,530

UNITED STATES PATENT OFFICE.

EARL W. SCHERMERHORN AND ROSWELL WOODRUFF, OF SCHENECTADY, NEW YORK.

TOOL FOR REMOVING VALVE SPRINGS.

Application filed July 26, 1921. Serial No. 487,591.

*To all whom it may concern:*

Be it known that we, EARL W. SCHERMERHORN and ROSWELL WOODRUFF, citizens of the United States of America, residing at Schenectady, in the county of Schenectady and State of New York, have invented certain new and useful Improvements in Tools for Removing Valve Springs, of which the following is a specification.

Our invention appertains to tools for removing valve springs from automobile engines, particularly those of the overhead type, and the object of our invention is to provide a simple and effective tool by the aid of which pressure may be applied to the valve spring cap and the spring compressed so as to expose the pin, or forked washer, used to trap the spring in a position where it may be easily gripped by a pair of pliers or other suitable tools and be removed from the valve stem.

Our improved tool is illustrated in the accompanying drawings in which:

Fig. 1 is a side elevation and illustrates our tool being used to expose a forked washer on the end of a valve stem.

Fig. 2 is a front elevation and illustrates our tool being used to expose a pin through the end of a valve stem.

The same reference characters refer to the same parts throughout the several views.

Referring to the drawings, A is the shank of our tool and is preferably made from steel of suitable dimensions, one end of the piece pointed as at E and adapted to be inserted in a handle F. The other end is pierced by an opening C and drawn so as to form a comparatively sharp annular ridge D about the opening C. The piece is then bent to shape substantially as illustrated.

In many of the automobile engines which use overhead type valves, the spring is capped by a formed washer shaped substantially as the washer G illustrated in the drawings and having a depression H, in the top thereof adapted to receive the forked washer L (or the pin N) and to prevent its accidental removal.

In order to remove the forked washer (or pin) it is necessary to compress the valve spring S, so that the end of the valve stem, with the forked washer, (or pin) will be above the spring cap so that the washer (or pin) may be withdrawn and the valve released.

Our tool is adapted to facilitate the removal of such washers or pins. The opening C is of sufficient diameter to permit the free passage therethrough of the end of the valve stem and such pin or washer, and by placing the tool in position over the end of the valve stem and against the spring cap and exerting pressure on the handle the spring and spring cap may be compressed until the spring cap is below the end of the valve stem and the washer or pin. The annular ridge D is adapted to contact with the depressed portion H of the washer on spring cap G as illustrated and to keep the tool concentric with the valve stem and also to prevent the tool from slipping.

We claim:

1. In a tool for use in removing valve springs from automobile engines, a spring-cap engaging member with an opening therethrough adapted to pass the end of the valve stem and the means used to prevent the removal of said spring cap from said valve stem; a shank portion extending from one side of said spring-cap engaging portion and extending upward and inward to a point substantially in line with the center of said opening; and a handle on the end of said shank.

2. In a tool for use in removing valve springs from automobile engines, a spring-cap engaging member with an opening therethrough adapted to pass the end of the valve stem and the means used to prevent the removal of said spring cap from said valve stem; a comparatively sharp annular ridge concentric with said opening and in the spring-cap engaging side of said portion, a shank portion extending from one side of said spring-cap engaging portion and extending upward and inward to a point substantially in line with the center of said opening; and a handle on the end of said shank.

In testimony whereof we have affixed our signatures.

EARL W. SCHERMERHORN.
ROSWELL WOODRUFF.